June 12, 1945.  W. RICHTER  2,377,969
APPARATUS FOR DETERMINING THE DURATION OF A TRANSIENT EFFECT
Filed June 1, 1942   2 Sheets-Sheet 2

Inventor
Walther Richter
By Frank H. Hubbard
Attorney

Patented June 12, 1945

2,377,969

UNITED STATES PATENT OFFICE 2,377,969

APPARATUS FOR DETERMINING THE DURATION OF A TRANSIENT EFFECT

Walther Richter, Whitefish Bay, Wis., assignor to Cutler-Hammer, Inc., Milwaukee, Wis., a corporation of Delaware Application June 1, 1942, Serial No. 445,393

14 Claims. (Cl. 161—15.2)

This invention relates to apparatus for determining the duration of a transient effect, and more particularly to an instrumentality for measuring the duration of an arc obtaining between contacts in an electric circuit when said contacts are separated to interrupt a current which flows in said circuit.

An object of the invention is to provide an instrument for measuring the duration of an arc incident to the opening of a circuit carrying a current.

Another object of the invention is to provide an instrument of high accuracy for measuring the duration of arcs.

Another object is to provide an instrument of the aforementioned character which has a minimum number of moving parts, whereby the tendency to introduce errors of a high order is reduced.

Another object is to provide an instrument of the aforementioned character which is readily adjustable for measuring time intervals of a wide range of magnitude.

Another object is to provide such an instrument which is self-contained, compact, and easily transportable.

Another object is to provide such a measuring instrument which is easily manipulated.

Other objects and advantages of the invention will hereinafter appear.

The invention provides for charging a condenser during the existence of an arc with a current which remains substantially constant during the entire charging period, that is, during the period during which the arc exists. The total charge of the condenser and hence its final voltage is then a linear function of the charging time. To attain this object the condenser is connected to a source of current in series with a tetrode or pentode tube. The plate current of such a tube is substantially constant over a wide range of plate voltages for constant screen grid voltage. In order to control the tetrode so as to provide a constant plate current, the invention provides for impressing on the tube during the existence of an arc, a control grid voltage and a screen grid voltage which are sufficient to cause the desired charging current to flow to the condenser, the value of the current being regulated by adjustment of the screen grid voltage.

Figure 3:
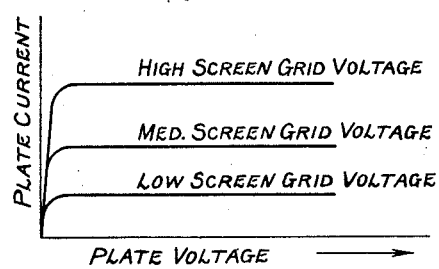

Fig. 3 is a diagram illustrating the relation between plate voltage and current of the tube for different screen grid voltages. It will be noticed that for any given screen grid voltage, the plate current remains substantially constant for a wide range of plate voltages above a very low minimum.

To measure the charge of the condenser its voltage is measured at the end of the charging period, that is, at the end of the arcing period, by impressing said condenser voltage on the grid of an electron tube whose equivalent resistance varies with the grid voltage. The latter tube forms one branch of a Wheatstone bridge across one diagonal of which is a constant direct current voltage, while a microammeter is connected across the other diagonal. The bridge is normally balanced by impressing a fixed voltage on the grid of the tube to affect its equivalent resistance so that no current flows through the microammeter. If now the accumulation of a charge on the condenser varies the potential of the grid of the tube its equivalent resistance increases and this unbalances the bridge and causes a current to flow in the microammeter, the current being directly proportional to the voltage of the condenser which in turn is a measure of the charging time.

The accompanying drawings are illustrative of an embodiment of the invention.

Figure 1:
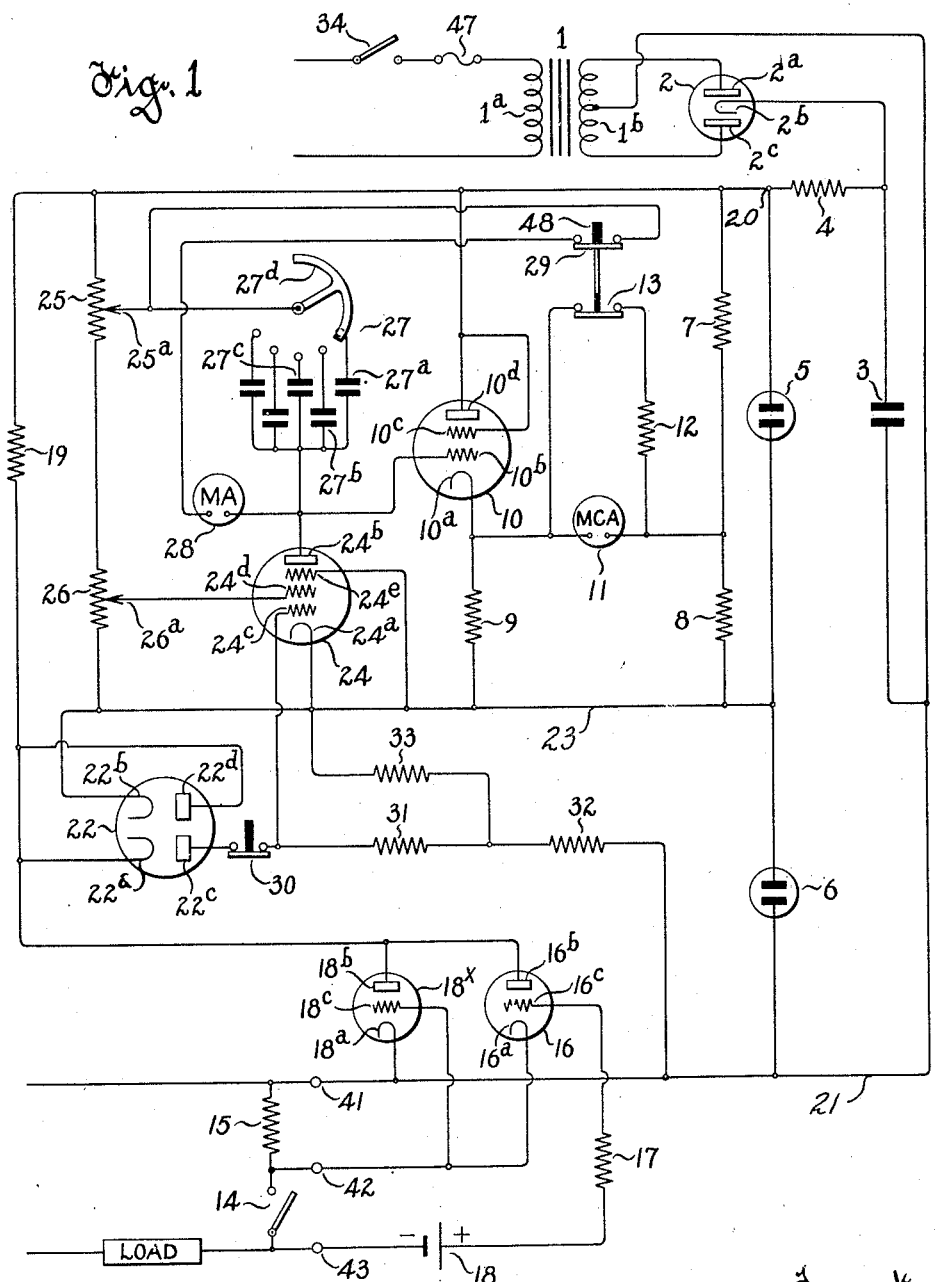
Figure 2:
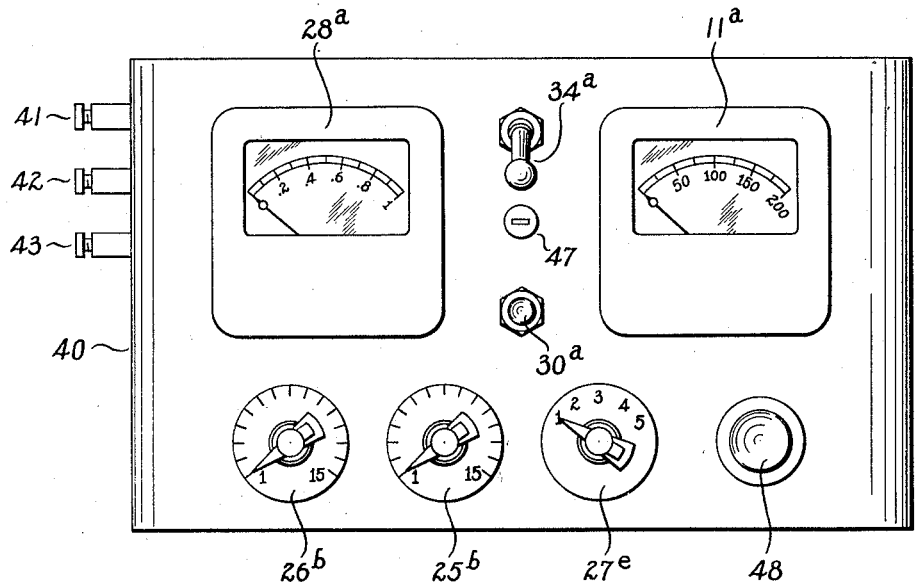

In the drawings, Figure 1 is a circuit diagram embodying the invention;

Fig. 2 is a front view of the instrument panel carrying the various instruments and operating switches, while Fig. 3 illustrates diagrammatically the relationship between the plate voltage and the plate current for different screen grid voltages of a pentode tube as used in the present system.

My invention will now be described by referring first to Fig. 1. In said figure a transformer 1 supplies the energy for operating the instruments. The transformer has a primary winding $1^a$ connectable through a switch 34 and a fuse 47 to a suitable source of alternating current voltage, and a center tapped secondary winding $1^b$. The two outside terminals of secondary winding $1^b$ of the transformer are connected to the anodes $2^a$ of a full wave rectifier 2, which is also provided with a cathode $2^b$ of any suitable type. Connected between the center tap of the winding $1^b$ and the cathode is a condenser 3 of relatively large capacity for smoothing out the ripples in the rectified direct current voltage which exists between said cathode and the center tap. This voltage in the present case is preferably approximately 300 to 350 volts.

Connected across the terminals of the condenser 3 in series with each other and in series with a resistor 4, are two voltage regulating tubes 5 and 6. The tube 5 preferably has an operating voltage of 150 volts, and the tube 6 preferably has an operating voltage of 90 volts. Connected in parallel with the tube 5 and in series with each other are two resistors 7 and 8, which form two adjoining branches of a Wheatstone bridge. The Wheatstone bridge is completed by a resistor 9 and a screen grid tube 10; the resistor 9 and the screen grid tube 10, connected as a triode, being connected in series with each other and in parallel with the resistors 8 and 7, respectively. The screen grid tube 10 has a cathode $10^a$, a control grid $10^b$, a screen grid $10^c$, and an anode $10^d$.

A microammeter 11 is connected between the common point of the resistors 7 and 8 and the common point of the resistor 9 and the cathode $10^a$, respectively. Microammeter 11 is paralleled by a resistor 12, controllable by a normally closed switch 13.

The switch, the operation of which is to be investigated by the instrument, is designated by the numeral 14. The switch 14 controls the current of a translating device. Included in the switch circuit is a resistor 15, the purpose of which will be explained hereinafter.

Connected to one terminal 42 of the switch 14 is the cathode $16^a$ of an electron tube 16, which is provided with an anode $16^b$, and a control grid $16^c$. The control grid $16^c$ is connected, in series with a resistor 17 and a bias battery 18 or other source of direct current voltage, to the second terminal 43 of the switch 14. The battery 18 has its positive pole nearest to the grid $16^c$.

A tube $18^x$ has a cathode $18^a$ which is connected to that terminal 41 of the resistor 15 which is farthest removed from the switch 14, and its grid $18^c$ is connected to the terminal 42 of the resistor 15 connected to the contacts 14. The anode $18^b$ of the tube $18^x$ is connected with the anode $16^b$ of the tube 16, and both of said anodes are connected through a resistor 19 to the positive pole 20 of the regulated power supply, represented by the joint terminal of the resistor 4 and the tube 5. The cathode $18^a$ is also connected to a bus bar 21, which in turn is connected to the center tap of the transformer secondary winding $1^b$, representing the negative pole of the direct power supply.

The system further includes a tube 22 which has two cathodes $22^a$ and $22^b$ and two cooperating anodes $22^c$ and $22^d$, respectively. The cathode $22^a$ and the anode $22^d$ are jointly connected to the anodes $16^b$ and $18^b$, and the cathode $22^b$ is connected to a bus bar 23, which in turn is connected to the common terminal of the tubes 5 and 6. A pentode 24 having a cathode $24^a$, an anode $24^b$, a control grid $24^c$, a screen grid $24^d$ and a suppressor grid $24^e$, has its cathode $24^a$ connected to the bus bar 23, while its anode $24^b$ is connected to a group of condensers 27.

Connected in series with each other and between the bus bars 20 and 23 are the adjustable voltage dividers 25 and 26, which are provided with movable contacts $25^a$ and $26^a$, respectively. Condenser group 27 comprises a number of sections $27^a$, $27^b$, $27^c$, etc., arranged for parallel connection of any desired number of sections by a switch $27^d$ and is inserted between the anode $24^b$ and the contact $25^a$. The number of condenser sections included in the circuit determines the range of the instrument—such range being selected according to the nature of the test to be made. Provisions are made for shunting the condensers 27 by a milliammeter 28 through a normally closed switch 29.

The anode $22^c$ of the tube 22 is connected through a control switch 30 (here shown as a normally closed pushbutton switch) to the control grid $24^c$. Connected in series between the control grid $24^c$ and the bus bar 21 are resistors 31 and 32. The control grid $24^c$ is connected through resistor 31 to a voltage divider formed by resistors 32 and 33 which are connected across bus bars 21 and 23.

Referring now to Fig. 2, the same illustrates an instrument which is constructed and assembled in accordance with the diagram shown in Fig. 1. The various elements of the system including the tubes, condensers, and resistors and switches aforedescribed are enclosed in a cabinet 40 which is provided with the three terminals 41, 42, 43, to be connected to a switch to be tested in accordance with the diagram of Fig. 1.

On the front side of the cabinet is installed the dial $28^a$ of the milliammeter 28. A second dial $11^a$ is the dial of the microammeter 11. The switch handle $34^a$ is the operating handle of the line switch 34, and below this is mounted the fuse 47. The pushbutton $30^a$ is adapted when depressed to open the normally closed contacts of switch 30.

A rotating indicator $26^b$ provided with a calibrated dial is connected to the contact $26^a$ of the potentiometer 26. A knob $25^b$ provided with a calibrated dial is connected to the contact $25^a$ of the potentiometer 25. An indicating knob $27^e$ provided with a calibrated dial is connected to the commutator $27^d$ for commutating the condenser sections $27^a$, $27^b$, etc. A pushbutton 48 is adapted when depressed to open the normally closed contacts 13 and 29.

Referring again to Fig. 1 it will be noted that on account of the rectifier action of the tube 22 current can only flow in the resistor 31 in a direction to increase the negative potential of the grid $24^c$ with respect to the cathode $24^a$. The resistors 31, 32 and 33 are so proportioned that said negative potential is of a value to render the tube 24 non-conducting.

The rectifier path $22^b$, $22^d$ becomes conducting when the anodes $16^b$ and $18^b$ tend to become positive with respect to the bus bar 23, thereby limiting the swing of the positive potential of said anodes and preventing delay in response of the tube 24. The cathode $22^a$ is connected to the resistor 19, which is the common load resistor of the tubes 16 and $18^x$. The tube 16 is normally conducting, but is rendered non-conducting when its grid $16^c$ is made negative with respect to its cathode $16^a$; that is, when there is a voltage drop across the contacts 14, exceeding the voltage of the battery 18, with a polarity making 43 negative with respect to 42. On the other hand, the tube $18^x$ is non-conducting if a voltage drop exists in the resistor 15. This takes place even with switch 14 open when an arc maintains current flow in the load circuit. The tube 16 responds in a similar manner to the voltage across the switch 14. The time during which an arc exists between the contacts 14 is therefore characterized by the simultaneous stoppage of current through the tubes 16 and $18^x$. When either tube 16 or $18^x$ carries current, a current flows through the resistors 19 and 31, the normally closed contacts of pushbutton switch 30 and the anode $22^c$ to cathode $22^a$, through the respective tube 16 or $18^x$ to bus bar 21. The flow of current through the resistor 31 makes the grid 24ᵉ more negative to stop the flow of charging current through the tube 24. With the switch 29 closed the charging current can be read on the milliammeter 28. The battery 19 insures a small positive potential to compensate for a possible voltage drop of the switch 14 in its closed position, which drop may render the grid 16ᶜ negative and stop current flow in tube 16 when not desired.

To operate the instrument connections are made between terminals 41, 42 and 43 to the power circuit as indicated in the diagram, Fig. 1, whereby the polarities are such that the terminal 41 is more positive than terminal 42 and the latter is more positive than terminal 43. The voltage drop of the resistor 15 should be between approximately 1 to 5 volts. The several adjustments of the instrument should be made with the switch 14 closed and preferably with no current flowing in the power circuit. The switch 34 is then closed and the cathodes of the various tubes are permitted to heat up to their normal temperatures. During the heating-up period the contact 13 should remain closed. Thereafter the contact 13 is opened and the current passing through the tube 10 is adjusted by adjustment of the contact 25ᵃ, which under these conditions regulates the potential of the grid 10ᵇ. The adjustment is made so that the instrument 11 reads zero. In other words, the bridge is balanced by making the voltage drop across the tube 10 equal to the voltage drop across resistor 7.

Thereafter normally closed contacts of pushbutton switch 30 are opened, by depressing the latter, and the plate current of tube 24 is adjusted to the desired point by moving contact 26ᵃ by means of the knob 26ᵇ (Fig. 2); that is, so that a potential is impressed upon the grid 24ᵈ which corresponds to the desired value of current passed by the tube 24, as has been explained heretofore. Thereafter the contact 27ᵈ is adjusted by knob 27ᵉ (Fig. 2) to connect the desired number of condenser sections in parallel. The condenser sections are preferably of equal capacity, so that the voltage rise of the condenser for a given charging period is inversely proportional to the number of sections connected in circuit. On the other hand, it will also be obvious that the voltage rise of the condensers is directly proportional to the product of the constant charging current and the charging time.

If it is desired to determine the duration of an arc on the switch 14, the switch 30 is closed and the switches 29 and 13 are opened. If now the contact 14 opens, a charging current will flow to the section or sections of condenser group 27 as long as the arc persists, as has been explained heretofore. This raises the voltage of the active sections of the condenser group 27 at a constant rate, and thus the potential of the grid 10ᵇ varies the current flow through the tube 10 and the instrument 11, until at the moment of interruption of the arc, the deflection of the instrument 11 is a maximum and this maximum deflection, which persists as long as the active condenser sections 27ᵃ, 27ᵇ, etc., are not measurably discharged, is a direct measure of the total energy stored in the active condenser sections, and as the latter were charged at a constant current, the deflection is also a measure of the time during which the arc persisted.

Should the voltage of the arc be too high for direct application to the grid 16ᶜ, a suitable voltage divider may be inserted in the circuit in a well known manner.

The instrument may also be used to measure the time of other transient conditions, such as a transient voltage or current in a circuit. For such measurements it is often only necessary to employ one of the tubes 16 or 18ˣ.

I claim:

1. In apparatus for determining the duration of a transient effect, the combination with a first electron tube having a cathode, an anode and a grid, of means to impress a voltage resulting from a characteristic of said transient effect upon said grid to vary the current flowing in said tube, a condenser, a second electron tube in circuit with said condenser and having a grid and adapted to maintain a substantially constant current flow therethrough, means to supply current to said second tube and said condenser, means to impress a voltage resulting from the variations of current flowing in said first electron tube upon the grid of said second tube to render said second tube conducting and to charge said condenser with a constant current, a third electron tube having a cathode, an anode and a grid, means to connect the cathode and anode of said third tube to a source of current, a connection between said condenser and said last named grid for impressing the voltage of said condenser upon the grid of said third tube, and means to measure the current in said third tube resulting from the potential impressed upon the grid thereof.

2. In apparatus for determining the duration of a transient effect, the combination with a first electron tube having a cathode, an anode and a grid, of means to impress a voltage resulting from a characteristic of said transient effect upon said grid to vary the current flowing in said tube, a variable condenser, a second electron tube in circuit with said condenser and having a first grid and adapted to maintain a substantially constant current flow therethrough, said second tube also having a second grid adapted to vary the magnitude of said current, means to supply current to said second tube and said condenser, means to impress a voltage resulting from variations of the current flowing in said first tube upon said first grid of said second tube to render the latter conducting and to charge said condenser with a current in accordance with the potential impressed upon said second grid of said second tube, a third electron tube having a cathode, an anode and a grid, means to connect the cathode and anode of said third tube to a source of current, means to impress the voltage of said condenser upon the grid of said third tube and means to measure the current in said third tube resulting from the potential impressed upon the grid thereof.

3. In apparatus for determining the duration of a transient effect, the combination with a first electron tube having a cathode, an anode and a grid, of means to impress a voltage resulting from a characteristic of said transient effect upon said grid to vary the current flowing in said tube, a condenser, a second electron tube in circuit with said condenser and having a grid and adapted to maintain a substantially constant current flow therethrough, means to supply current to said second tube and said condenser, means to impress a voltage resulting from variations of the current flowing in said first electron tube upon the grid of said second tube to render said second tube conducting and to charge said condenser, a third electron tube having an anode, a cathode and a grid, three resistors, each of said resistors and said third tube forming one of the four sides of a normally balanced Wheatstone bridge, means to impress a potential across one diagonal of said Wheatstone bridge, and means to measure the potential across the other diagonal of said bridge resulting from an unbalance thereof by the change in current flow through said third tube in response to the voltage impressed upon its grid by said condenser.

4. In apparatus for determining the duration of a transient effect, the combination with a first electron tube having a cathode, an anode and a grid, of means to impress a voltage resulting from a characteristic of said transient effect upon said grid to vary the current flowing in said tube, a condenser, a second electron tube in circuit with said condenser and having a first grid which tends to maintain a substantially constant current flow therethrough, said second tube also having a second grid adapted to vary the magnitude of said current, means to supply current to said second tube and said condenser, means to impress a voltage resulting from the variations of current flowing in said first electron tube upon the first grid of said second tube to render the latter conducting and to charge said condenser with a current in accordance with the potential impressed upon the second grid of said second tube, a third electron tube having an anode, a cathode and a grid, three resistors, said resistors and said third tube each forming one of the four sides of a normally balanced Wheatstone bridge, means to impress a potential across one diagonal of said bridge, and means to measure the potential across the other diagonal of said bridge resulting from an unbalance thereof by the change in current flow through said third tube in response to the voltage impressed upon its grid by said condenser.

5. In apparatus for determining the duration of a transient effect, the combination with a first electron tube having a cathode, an anode and a grid, of means to impress a voltage resulting from a characteristic of said transient effect upon said grid to vary the current flowing in said tube, a variable condenser, a second electron tube in circuit with said condenser and having a first grid and adapted to maintain a substantially constant current flow therethrough, said second tube also having a second grid, means to impress an adjustable potential upon said last mentioned grid to thereby vary the magnitude of said current, means to supply current to said second tube and said condenser, means to impress a voltage resulting from variations of the current flowing in said first tube upon the first grid of said second tube to render the latter conducting and to charge said condenser with a current in accordance with the potential impressed upon the second grid of said second tube, a third electron tube having a cathode, an anode and a grid, means to connect the cathode and anode of said third tube to a source of current, means to impress the voltagee of said condenser upon the grid of said third tube, and means to measure the current flowing through said third tube as a result of the potential impressed upon the grid thereof.

6. In apparatus for determining the duration of a transient effect, the combination with a first electron tube having a cathode, an anode and a grid, of means to impress a voltage resulting from a characteristic of said transient effect upon said grid to vary the current flowing in said tube, a condenser, a second electron tube in circuit with said condenser and having a first grid normally adapted to maintain a constant current flow therethrough, said second tube also having a second grid, means to impress an adjustable potential upon said last mentioned grid to thereby vary the magnitude of said current, means to supply current to said second tube and said condenser, means to impress a voltage resulting from the variations of current flowing in said first electron tube upon the first grid of said second tube to render the latter conducting and to charge said condenser with a constant current, and means for measuring the total charge of said condenser.

7. In apparatus for determining the duration of an arc, the combination with a condenser for accumulating a charge, of means responsive to the current and the voltage of said arc including means to supply a substantially constant charging current to said condenser, and means for measuring the total charge of said condenser.

8. In apparatus for determining the duration of an arc, the combination of a condenser for accumulating a charge, means responsive individually to the voltage and to the current of an arc including means to supply a substantially constant charging current to said condenser during the existence of an arc, and means for measuring the terminal voltage of said condenser resulting from said charging current.

9. In apparatus for determining the duration of an arc, the combination with a condenser, of an electron tube connected to respond to the voltage of said arc, a second electron tube connected to respond to the current of said arc, a third electron tube having a cathode, an anode and a grid connected in circuit with said condenser and adapted to maintain a substantially constant current flow therethrough, means to supply current to said electron tubes, means to impress the current of said first and said second tubes upon the grid of said third tube to render the latter conducting and to charge said condenser, and means for measuring the total charge of said condenser.

10. In apparatus for determining the duration of a transient effect, the combination with an electron tube provided with a first and a second control grid, and adapted to pass a current substantially independent of the voltage impressed upon said tube, of current responsive means connected in circuit with said tube, means to connect said tube to a current source, means arranged to normally impress upon said first grid a potential rendering said tube non-conducting, said means being responsive to a characteristic of a transient to modify said potential and render said tube conducting and supply a constant current to said condenser, and means to impress upon said second control grid a potential adapted to vary the current passing through said tube in accordance with the magnitude of said last named potential.

11. In apparatus for determining the duration of a transient effect, the combination with an electron tube provided with a first and a second control grid, and adapted to pass a current substantially independent of the voltage impressed upon said tube, of a condenser connected in circuit with said tube, means to connect said tube and said condenser to a source of current for charging said condenser by the current passed by said tube, means arranged to normally impress upon said first grid a potential rendering said tube non-conducting, said means responding to a characteristic of a transient to modify said potential and render said tube conducting and supply a constant current to said condenser, means to impress upon said second control grid a potential adapted to vary the current passing through said tube in accordance with the magnitude of said last named potential, and means to measure the voltage of said condenser resulting from the current passed by said tube.

12. In apparatus for determining the duration of a transient effect, the combination with a first electron tube provided with a first and a second control grid, and adapted to pass a current substantially independent of the voltage impressed upon said tube, of a condenser connected in circuit with said tube, means to connect said tube and said condenser to a source of current for charging said condenser by the current passed by said tube, means arranged to normally impress upon said first grid a potential rendering said tube non-conducting, said means responding to a characteristic of a transient to modify said potential and render said tube conducting and supply a constant current to said condenser, means to impress upon said second control grid a potential adapted to vary the current passing through said tube in accordance with the magnitude of said last named potential, a second electron tube having a cathode, an anode, and a grid, means to connect the cathode and anode of said second tube to a source of current, means to impress the voltage of said condenser upon the grid of said second tube, and means to measure the current flowing through said second tube as a result of the potential impressed upon the grid of said second tube.

13. In apparatus for determining the duration of an arc, the combination with a condenser for accumulating a charge, of means responsive to at least one characteristic of said arc and arranged to supply a substantially constant charging current to said condenser in response to variations of said characteristic, and means for measuring the total charge of said condenser.

14. In apparatus for measuring the period of simultaneity of two characteristic physical quantities of a system, the combination of a first and a second electron tube each having a cathode, an anode, and a grid, means to impress upon the grid of one tube a voltage controlled by one of said quantities and upon the grid of the other tube a voltage controlled by the other quantity to thereby vary the values of the currents flowing in the respective tubes, a condenser, a third electron tube in circuit with said condenser and having a first grid adapted to maintain a substantially constant current flow therethrough, said third tube also having a second grid adapted to vary the magnitude of said current, means to supply current to said third tube and said condenser, means to impress upon said second grid of said third tube a constant voltage which is controlled by the output currents of said first and second tubes to render said third tube conducting and to charge said condenser with a constant current, and means to measure the charge of said condenser.

WALTHER RICHTER.